(12) United States Patent
Matsumoto

(10) Patent No.: US 11,247,480 B2
(45) Date of Patent: Feb. 15, 2022

(54) IMAGE SHEET AND METHOD FOR PRODUCING THE SAME

(71) Applicant: PHOTO CRAFT CO., LTD., Toyonaka (JP)

(72) Inventor: Iwao Matsumoto, Toyonaka (JP)

(73) Assignee: PHOTO CRAFT CO., LTD., Osaka (JP)

( * ) Notice: Subject to any disclaimer, the term of this patent is extended or adjusted under 35 U.S.C. 154(b) by 0 days.

(21) Appl. No.: 16/763,896

(22) PCT Filed: Oct. 5, 2018

(86) PCT No.: PCT/JP2018/037360
§ 371 (c)(1),
(2) Date: May 13, 2020

(87) PCT Pub. No.: WO2019/102725
PCT Pub. Date: May 31, 2019

(65) Prior Publication Data
US 2021/0170762 A1 Jun. 10, 2021

(30) Foreign Application Priority Data
Nov. 21, 2017 (JP) .............................. JP2017-223857

(51) Int. Cl.
*B41J 2/21* (2006.01)
*B41M 5/00* (2006.01)
(Continued)

(52) U.S. Cl.
CPC .............. *B41J 2/21* (2013.01); *B41M 5/0047* (2013.01); *C09D 11/30* (2013.01); *G09F 7/16* (2013.01); *G09F 13/08* (2013.01)

(58) Field of Classification Search
CPC ... C09D 11/107; C09D 11/322; C09D 11/101; C09D 11/326; C09D 11/38; C09D 11/40;
(Continued)

(56) References Cited

U.S. PATENT DOCUMENTS 9,449,250 B1 * 9/2016 Cherry ............... H04N 1/00838
9,675,995 B1 * 6/2017 Lowe, Jr. .................. B44C 3/02
(Continued)

FOREIGN PATENT DOCUMENTS

JP   S62298894 A   12/1987
JP   2004306432 A  11/2004
(Continued)

*Primary Examiner* — Manish S Shah
(74) *Attorney, Agent, or Firm* — The Webb Law Firm

(57) ABSTRACT

An image sheet capable of maintaining good image quality without a change in density or color in a low-density part of an image is provide. The image sheet for both transmitted light and reflected light includes: a base layer formed of a light-transmitting white resin film; a first image layer formed of a first color image formed on one surface of the base layer; a second image layer formed of a second white image formed on the first image layer so that a position of the same image as the first image is superimposed on the position of the first image; and a third image layer formed of a third color image formed on the second image layer so that a position of the same image as the first image is superimposed on the position of the first image.

11 Claims, 12 Drawing Sheets

20  IMAGE PROCESSING DEVICE
21  ORIGINAL IMAGE DATA
25  DENSITY EXTRACTING UNIT
22  FIRST IMAGE DATA
23  SECOND IMAGE DATA
24  THIRD IMAGE DATA
30  PRINTER
31  COLOR CONVERSION
32  FIRST PRINT DATA
33  SECOND PRINT DATA
34  THIRD PRINT DATA
35  PRINT HEAD

(51) Int. Cl.
*C09D 11/30* (2014.01)
*G09F 7/16* (2006.01)
*G09F 13/08* (2006.01)

(58) Field of Classification Search
CPC ....... C09D 11/30; C09D 11/32; C09D 11/324; C09D 11/328; C09D 11/102; C09D 11/005; C09D 11/54; C09D 11/52; C09D 11/106; B41J 11/0021; B41J 2/2107; B41J 2/01; B41J 11/002; B41J 2/211; B41J 2/1433; B41J 2/17; B41J 2/17593; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41M 5/0023; B41M 7/0081; B41M 3/006; B41M 3/003; B41M 5/0011; B41M 5/0017; B41M 5/0047; B41M 7/00; B41M 7/0072; B41M 5/52; B41M 5/5218; B41M 5/5227; G02B 5/20; G02B 5/223; C08K 3/11; C08K 2003/2237

See application file for complete search history.

(56) References Cited

U.S. PATENT DOCUMENTS

| | | | |
|---|---|---|---|
| 2003/0035917 A1* | 2/2003 | Hyman | B41M 5/36 428/67 |
| 2006/0158481 A1 | 7/2006 | Spevak et al. | |
| 2009/0322814 A1* | 12/2009 | Sano | B41J 2/2114 347/12 |
| 2015/0125829 A1* | 5/2015 | Hyman | B44C 3/046 434/81 |

FOREIGN PATENT DOCUMENTS

| | | |
|---|---|---|
| JP | 3871436 B2 | 10/2006 |
| JP | 20105878 A | 1/2010 |
| JP | 2011101976 A | 5/2011 |
| JP | 4785615 B2 | 7/2011 |

* cited by examiner

| 20 | IMAGE PROCESSING DEVICE |
| 21 | ORIGINAL IMAGE DATA |
| 25 | DENSITY EXTRACTING UNIT |
| 22 | FIRST IMAGE DATA |
| 23 | SECOND IMAGE DATA |
| 24 | THIRD IMAGE DATA |
| 30 | PRINTER |
| 31 | COLOR CONVERSION |
| 32 | FIRST PRINT DATA |
| 33 | SECOND PRINT DATA |
| 34 | THIRD PRINT DATA |
| 35 | PRINT HEAD |

| | |
|---|---|
| 20B | IMAGE PROCESSING DEVICE |
| 21 | ORIGINAL IMAGE DATA |
| 26 | FIRST CORRECTION UNIT |
| 25 | DENSITY EXTRACTING UNIT |
| 27 | THIRD CORRECTION UNIT |
| 22 | FIRST IMAGE DATA |
| 23 | SECOND IMAGE DATA |
| 24 | THIRD IMAGE DATA |

11 PREPARE BASE LAYER
12 PRINT FIRST IMAGE
13 PRINT SECOND IMAGE
14 PRINT THIRD IMAGE

IMAGE SHEET AND METHOD FOR PRODUCING THE SAME

CROSS-REFERENCE TO RELATED APPLICATIONS

This application is the United States national phase of International Application No. PCT/JP2018/037360 filed Oct. 5, 2018, and claims priority to Japanese Patent Application No. 2017-223857 filed Nov. 21, 2017, the disclosures of which are hereby incorporated by reference in their entirety.

BACKGROUND OF THE INVENTION

Field of the Invention

The present invention relates to an image sheet for both transmitted light and reflected light and a method for producing the same.

Description of Related Art

In the related art, a panel (signboard) for both transmitted light and reflected light is often used on a wall of a shopping mall, a station yard, or an indoor wall of a hotel or the like for the purpose of advertising or decoration.

Normally, in such a panel, an image sheet, on which an image for advertisement or decoration is to be formed on an appropriate panel frame, and illuminating is performed from the back of the image sheet with a fluorescent light, an LED, or the like.

In a case where the surrounding environment is bright, such as during the daytime, sunlight or external light can be reflected on an image display surface so that the panel can be seen as a normal clear image panel. In a case where the outside is dark, such as during the night, the panel can be seen as a panel of a bright and clear image by the transmitted light due to illumination from the back.

In the related art, as such an image sheet, an image sheet 9 in which image layers 91 and 92 of the same image are formed on the front and back of a translucent sheet 90 as shown in FIGS. 12A and 12B is used (Japanese Patent No. 3871436).

In addition, in order to improve weatherability, it has been proposed to further form an intermediate layer that absorbs ultraviolet light on an image layer and a third image layer thereon (Japanese Patent No. 4785615).

Further, as another image sheet, as shown in FIGS. 11A and 11B, an image sheet 8 including a base layer 80 formed of a transparent resin film, a first image layer 81 formed of a first image formed on one surface of the base layer 80, a milky white layer 82 formed on a surface of the first image layer 81, and a second image layer 83 formed of a second image formed on the surface of the milky white layer 82 so that a position of the image is superimposed with the first image has been proposed (JP-A-2004-306432).

[PTL 1] Japanese Patent No. 3871436
[PTL 2] Japanese Patent No. 4785615
[PTL 3] JP-A-2004-306432

SUMMARY OF INVENTION

Technical Problem

In the image sheet 9 disclosed in Japanese Patent No. 3871436 and Japanese Patent No. 4785615, it is necessary to once remove an image sheet obtained by printing on one surface of the sheet 90 from a printer, turn the sheet over, and set the sheet in a printer again, in order to print images on both front and back surfaces of the sheet 90 which is a support. Accordingly, a manual operation must be performed in a printing process for one image sheet 9, which requires a lot of time and effort.

In addition, since the image layer 91 on the front side and the image layer 92 on the back side must be precisely positioned, it is necessary to precisely position the sheet 90, which requires a lot of time and effort.

As a result, it takes a lot of time to produce an image sheet for both transmitted light and reflected light, which causes a longer delivery time and a higher cost.

In addition, in the image sheet 8 disclosed in JP-A-2004-306432, there is a possibility that an original density or color of an image is changed due to the presence of the milky white layer 82.

That is, as disclosed in JP-A-2004-306432, the milky white layer 82 is formed by performing printing using milky white ink, or by performing applying, printing, or coating using a milky white emulsion. A light transmittance of the milky white layer 82 is approximately 20 to 80 percentages.

Therefore, particularly in a case of being seen with the transmitted light, the density of the image is added by the amount of the density of the milky white layer 82 and deviates from the original density of the image. In addition, the original color of the image varies depending on the color of the milky white layer 82.

Such a change in density or color of an image is not so noticeable in a high-density part of an image, but becomes noticeable in a low-density part of an image, for example, a part where the color of an image is close to white, thereby deteriorating image quality.

In a case where an image in which a photograph or illustration of an article is arranged in a white (colorless) background is used as the image, the density and color of the milky white layer 82 are strongly reflected in the background portion. In this case, in a case where the size of the image is smaller than the size of the base layer 80, a level difference in density or color is generated between the background portion of the image and a region outer side the image, and a boundary part appears as an edge of the image. That is, the edge of the image enters as noise to deteriorate image quality, and a value of the image sheet for advertisement or decoration is reduced.

SUMMARY OF THE INVENTION

The invention has been made in view of the above-described problems, and an object thereof is to provide an image sheet capable of maintaining excellent image quality without causing a change in density or color in a low-density part of an image of a sheet, which is not necessarily turned over front and back surfaces in producing an image sheet for both transmitted light and reflected light, and the cost of which can be reduced by reducing time and effort necessary for the producing.

The image sheet according to the embodiment of the invention is an image sheet for both transmitted light and reflected light, the image sheet including: a base layer formed of a light-transmitting white resin film; a first image layer formed of a first color image formed on one surface of the base layer; a second image layer formed of a second white image formed on the first image layer so that a position of the same image as the first image is superimposed on a position of the first image; and a third image layer formed of a third color image formed on the second image layer so that a position of the same image as the first image is superimposed on a position of the first image.

A method for producing an image sheet according to the embodiment of the invention is a method for producing an image sheet for both transmitted light and reflected light based on original color image data, the method including: a first step of forming a first image layer by printing a first color image based on the original image data on one surface of a base layer formed of a light-transmitting white resin film; a second step of forming a second image layer by printing a second white image based on the original image data on the first image layer so as to be superimposed on a position of the first image; and a third step of forming a third image layer by printing a third color image based on the original image data on the second image layer so as to be superimposed on a position of the first image.

According to the invention, it is possible to provide an image sheet capable of maintaining excellent image quality without causing a change in density or color in a low-density part of an image of a sheet, which is not necessarily turned over front and back surfaces in producing an image sheet for both transmitted light and reflected light, and the cost of which can be reduced by reducing time and effort necessary for the producing.

DESCRIPTION OF THE INVENTION

Figure 1:
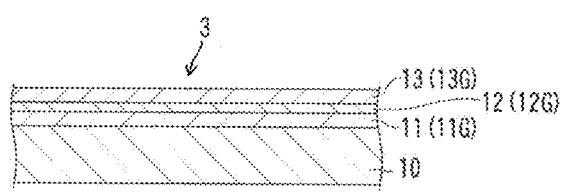
FIG. 1 is a cross-sectional view of an image sheet according to the invention.
Figure 2:
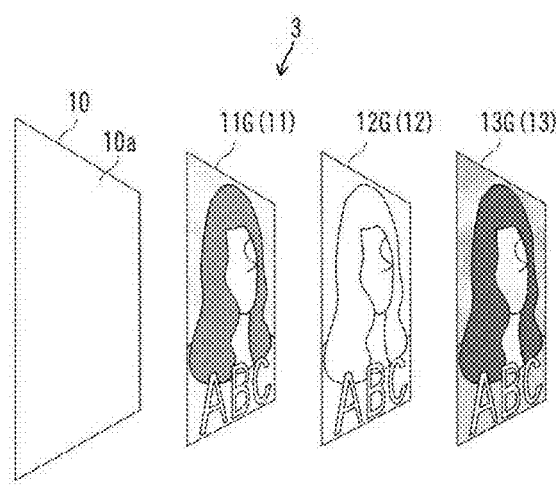
FIG. 2 is a diagram for explaining a configuration of the image sheet.
Figure 3:
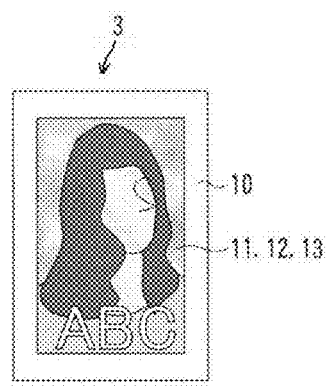
FIG. 3 is a front view of the image sheet.

FIG. 1 is a cross-sectional view of an image sheet 3 according to the invention, FIG. 2 is a diagram for explaining a configuration of the image sheet 3, and FIG. 3 is a front view of the image sheet 3, respectively.

In FIG. 1 to FIG. 3, the image sheet 3 is an image sheet for both transmitted light and reflected light, the image sheet including: a base layer 10 formed of a light-transmitting white resin film; a first image layer 11 formed of a first color image 11G formed on one surface 10a of the base layer 10; a second image layer 12 formed of a second white image 12G formed on the first image layer 11 so that a position of the same image as the first image 11G is superimposed on the position of the first image; and a third image layer 13 formed of a third color image 13G formed on the second image layer 12 so that a position of the same image as the first image 11G is superimposed on the position of the first image.

In the embodiment, the first image 11G, the second image 12G, and the third image 13G are each printed by an inkjet method based on image data generated based on original color image data. By printing, the first image layer 11, the second image layer 12, and the third image layer 13 are sequentially formed.

In FIG. 2, the first image 11G, the second image 12G, and the third image 13G are all female portraits with capital letters "ABC", and have the same image content, but each color used to form the image and the density of each color are not the same as will be described later.

As shown in FIG. 3, in the image sheet 3, the first image layer 11, the second image layer 12, and the third image layer 13 smaller than the base layer 10 are formed on the base layer 10 by printing.

The original image data is image data which is a base of the first image 11G, the second image 12G, and the third image 13G. The original image data can be created using various kinds of painting materials such as photographs, illustrations, and CG (computer graphics). It may be created by editing a plurality of painting materials.

The base layer 10 may be formed by forming a resin such as polyester or vinyl chloride into a translucent film. In addition, in order to increase hardness, a cloth or a net formed by knitting polyester fiber, cotton fiber, glass fiber may be used, and this may be coated or impregnated with a resin such as vinyl chloride or urethane. These are all included in the light-transmitting white resin film. A resin film having other structures and materials may be used.

A thickness of the base layer 10 may be approximately several tens to several hundreds μm or approximately 1 mm, and may be the thickness other than this. The base layer 10 preferably has a high transmittance of visible light, and preferably has a white color so that the transmitted light is not colored. However, the base layer may have milky white or a color mixed with light color components. That is, "white" includes milky white or a color mixed with light color components.

In a case where the base layer 10 contains a light color component, the color of the first image 11G or the third image 13G is adjusted or the light emission characteristics of the illumination light are adjusted, so that the color of the base layer can be adjusted to be close to the color of the original image data. It is more effective to perform such a color adjustment on the first image 11G that is viewed with the transmitted light by illumination. In addition, an appropriate surface treatment may be performed on the base layer 10 so that the printing ink can be easily applied.

In the embodiment, a size (length×width) of the base layer 10 is larger than a size of an image to be printed on a surface thereof. That is, an image is printed on a part of the surface of the base layer 10, and no image is printed on a peripheral part of the base layer 10 which is an outer side of the image.

The first image 11G is formed based on original color image data. For example, the first image may be formed using the original image data as it is. In addition, for example, the first image 11G having a density adjusted with respect to the original image data by increasing or decreasing the density of each color component to have a predetermined ratio to the density of each color component of the original image data may be used. In this case, the predetermined ratio of the density may be different for each color component. Such density adjustment can be performed, for example, according to an intensity of illumination light or color rendering properties.

The second image 12G is in white, and a density thereof is set based on the density of each color component of the first image 11G. For example, for each pixel, the density of the second image 12G may be an average density of each color component of the first image 11G. In addition, a weighted average of each color component may be used. In this case, a NTSC coefficient, an HDTV coefficient, or the like may be used as a weighting coefficient. In addition, an intermediate value between a maximum value and a minimum value of the density of each color component may be used. Data converted from a color image into a monochrome image using various commercially available image processing software or the like may be used.

Since the first image 11G is formed based on the original image data, it can be also said that the density of each color component of the second image 12G is set based on the density of each color component of the original image data.

In the second image 12G, for example, a large amount of white ink is printed on a high-density part, and a small amount of white ink is printed on a low-density part. No or little ink adheres to the part where the density is 0. That is, white ink is printed by an amount corresponding to the density. Therefore, although the second image layer 12 is a layer formed of white ink, it can be said that the second image layer 12 is a layer formed of an amount of ink corresponding to the density of each part in the second image 12G.

Therefore, in the second image 12G, the amount of ink is extremely small in a part having an extremely low density, that is, a part in a color extremely close to white, and the layer in this part is extremely thin. Therefore, for example, in a case of being seen with transmitted light, there is no change in density or color due to that part of the second image 12G, and therefore the appearance becomes the same as that of the base layer 10, and the no level difference in density and color due to the second image 12G is found in this part.

Even in a case where the white color of the ink has a difference in density or color from the white color of the base layer 10, there is no level difference in density and color due to the second image 12G in an extremely-low-density part, in the same manner as described above.

The third image 13G is set based on the density of each color component of the original image data or the first image 11G. For example, the third image may be formed using the original image data as it is. In addition, the third image may be formed using each color component of the first image 11G as it is.

In the embodiment, the first image layer 11 and the third image layer 13 are formed by printing using ink of each color component of cyan (C), magenta (M), yellow (Y), and black (K). In addition to these colors, various colors such as light cyan, light magenta, orange, and red may be used as the color of the ink. The second image layer 12 is formed by printing using white (W) ink.

In this embodiment, ultraviolet curable ink is used as the ink. By using an ultraviolet curable ink, the ink is immediately cured and dried by emitting ultraviolet rays immediately after printing by a print head of a printer, and the next image can be immediately printed thereon.

Figure 4:
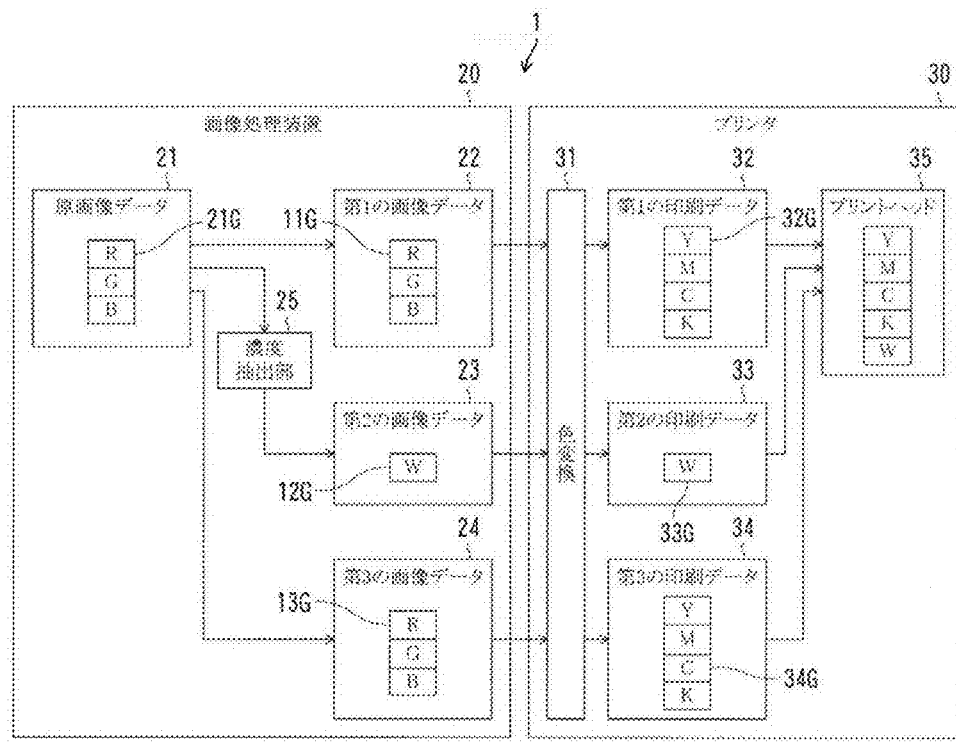
FIG. 4 is a diagram showing an example of a configuration of an image printing system for producing the image sheet.
Figure 5:
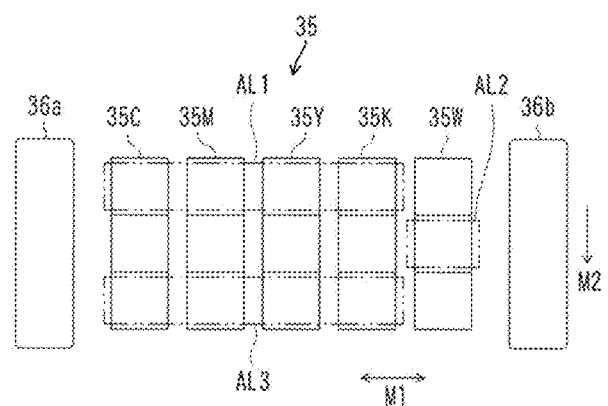
FIG. 5 is a diagram showing a part of a printer head.

FIG. 4 shows an example of a configuration of an image printing system 1 for producing the image sheet 3 and FIG. 5 shows a diagram a print head 35 seen from the front, respectively.

In FIG. 4, the image printing system 1 includes an image processing device 20 and a printer 30.

The image processing device 20 includes a memory 21 for storing original image data 21G, memories 22, 23, and 24 for storing a first image 11G, a second image 12G, and a third image 13G, respectively, a density extracting unit 25, and the like.

In the embodiment, each of the original image data 21G, the first image 11G, and the third image 13G is image data or an image based on full-color image data formed of each color component of red (R), green (G), and blue (B). The second image 12G is an image based on white (W) image data.

These pieces of image data are data indicating a density of, for example, 256 gradations for each color component. In this case, in the additive system, pure white data (R, G, B) is (255, 255, 255), and pure black data (R, G, B) is (0, 0, 0). In the white data (W), for example, (W)=(0) or (255), and the amount of ink becomes maximum or minimum.

The density extracting unit 25 extracts a density of the second image 12G, that is, a density of white (W) from the original image data 21G. For example, in a case where each color component of the original image data 21G is data of 256 gradations, calculation is performed on the density of each color component to calculate 256-gradation white (W) density data. For example, an average density of each color component of the original image data 21G, a weighted average density, a root-mean-square density, or a density of each specific color component may be used.

In FIG. 4, the density extracting unit 25 extracts the density of the second image 12G from the original image data 21G, and the original image data 21G and the first image 11G have the data having the same content, and therefore, the extracting is performed in the same manner as from the first image 11G.

In addition, the memory 22 for storing the first image 11G may be omitted, and the original image data 21G stored in the memory 21 may be used as the first image 11G.

The printer 30 includes a color conversion unit 31, memories 32, 33, and 34 storing first print data 32G, second print data 33G, and third print data 34G, respectively, a print head 35, and the like.

The color conversion unit 31 converts each of the RGB data sent from the image processing device 20 into CMYK data.

The first print data 32G and the third print data 34G are CMYK data corresponding to the RGB data of the first image 11G and the third image 13G, respectively. Since the second image 12G has W data, W data as it is or (255-W) data is output.

The first image layer 11 and the third image layer 13 are practically printed using the first print data 32G and the third print data 34G, but the contents of the images are the same, and accordingly, the description will be made assuming that the first image 11G and the third image 13G are used.

The print head 35 performs ink jet printing based on the first print data 32G, the second print data 33G, and the third print data 34G.

As shown in FIG. 5, the print head 35 includes inkjet heads 35C to 35W (35C, 35M, 35Y, 35K, and 35W) of each color of cyan (C), magenta (M), yellow (Y), black (K), and white (W). Each head includes a large number of nozzles arranged in a matrix and ejects an amount of ink controlled by each print data. The white (W) ink may be, for example, ink using silica or titanium white (titanium oxide) as a pigment.

The print head 35 of the embodiment reciprocates in a main scanning direction (M1 direction, horizontal direction), thereby printing an image on the base layer 10. The base layer 10 serving as an image sheet moves in a sub-scanning direction (M2 direction, vertical direction) with respect to the print head 35.

In addition, the base layer 10 may be fixed without moving, and the print head 35 may move in XY directions on a two-dimensional plane.

The nozzles of the inkjet heads 35C to 35W are divided into three regions along the sub-scanning direction (M2 direction), that is, a first region AL1, a second region AL2, and a third region AL3. The nozzles in the first region AL1 operate for printing the first image 11G, the nozzles in the second region AL2 operate for printing the second image 12G, and the nozzles in the third region AL3. The nozzle operates for printing the third image 13G.

In the print head 35, ultraviolet light sources 36a and 36b for emitting ultraviolet light are provided on both sides thereof and move in the main scanning direction together with the print head 35. The ink ejected toward the base layer 10 by the inkjet heads 35C to 35W is irradiated with ultraviolet light by the ultraviolet light sources 36a and 36b, immediately after that, and is immediately cured and dried.

Therefore, in the first operation, the first image 11G in the first region AL1 is printed on a surface of the base layer 10 by the movement of the print head 35 in the main scanning direction.

In the second operation, by sending the base layer 10 by the width of the region in the sub-scanning direction, the second image 12G by the second region AL2 is printed on the first image 11G, and the first image 11G by the first region AL1 is printed continuous to the first image 11G.

In the third operation, by further sending the base layer 10 by the width of the region in the sub-scanning direction, the third image 13G by the third region AL3 is printed on the second image 12G, the second image 12G by the second region AL2 is printed on the first image 11G, and the first image 11G by the first region AL1 is printed continuous to the first image 11G.

As described above, the movement of the print head 35 in the main scanning direction and the movement of the base layer 10 in the sub-scanning direction are performed continuously or intermittently, so that the first image 11G, the second image 12G, and the third image 13G are sequentially printed on the base layer 10, and accordingly, the image sheet 3 is produced.

The first to third images 11G to 13G are sequentially printed by the nozzles in the first to third regions AL1 to AL3 by the movement of the print head 35 in the main scanning direction, and the printing of the entire surface of the base layer 10 is completed by one movement of the print head 35 from the start end to the final end in the sub-scanning direction.

Regarding the image sheet 3 configured as described above, natural light or light for illumination that is incident from the outside is reflected by the third image layer 13 and the second image layer 12, and the third image 13G is displayed brightly and sharply by the reflected light. In addition, in a case where there is no light incident from the outside, the superimposed image of the first image 11G and the third image 13G is displayed brightly and sharply by the transmitted light by the illumination from the back surface of the base layer 10. That is, the image is sharply displayed by both the transmitted light and the reflected light.

According to the image printing system 1 of the embodiment, in printing the image sheet 3 for both transmitted light and reflected light, the first image 11G, the second image 12G, and the third image 13G are sequentially printed at correct positions, by setting the base layer 10 which is a support in the printer 30 only once, and accordingly, the time and effort required to produce the image sheet 3 are significantly reduced.

Since the first image 11G, the second image 12G, and the third image 13G are sequentially printed on the same surface of the base layer 10, there is no need to remove the base layer 10 once and turn it upside down, which can significantly reduce time and effort, and the positioning of each image is performed accurately and precisely. Therefore, time and effort required for producing the image sheet 3 can be reduced, thereby reducing the cost.

In addition, the second image layer 12 is formed of an image based on the original image data, that is, the second image 12G having a density set based on the density of each color component of the first image 11G or the third image 13G by printing with the white (W) ink, and accordingly, a thickness of the second image layer 12 is reduced in a part where the density of the image is low, and good image quality is maintained without an effect of the density or the color due to the second image layer 12.

Figure 6:
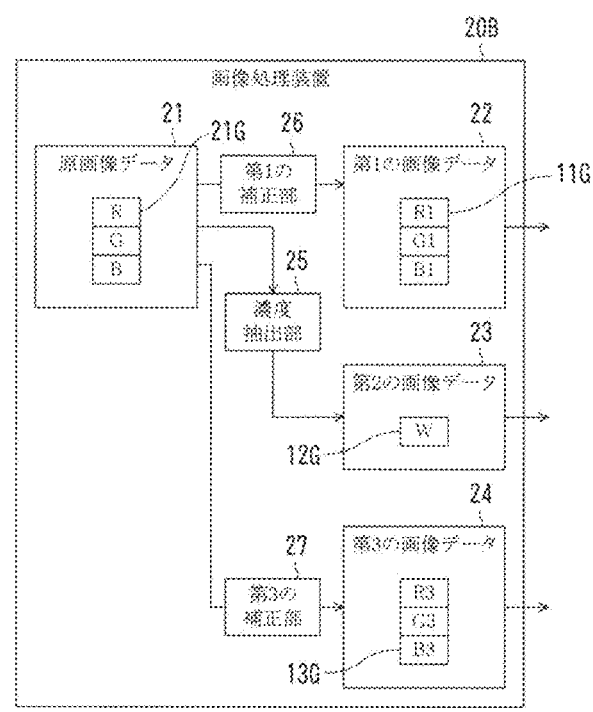
FIG. 6 is a block diagram showing another example of an image processing device.

FIG. 6 shows a block diagram of another example of an image processing device 20B.

in FIG. 6, the same reference numerals are used for the parts of the same functions as those of the image processing device 20 shown in FIG. 4 and the description thereof will be omitted.

The image processing device 20B shown in FIG. 6 includes a first correction unit 26 and a third correction unit 27.

The first correction unit 26 performs a color or density correction process on the RGB components of the original image data 21G, and outputs the first image 11G with R1, G1, and B1.

The third correction unit 27 performs a color or density correction process on the RGB components of the original image data 21G, and outputs the third image 13G with R3, G3, and B3.

The correction by the first correction unit 26 and the third correction unit 27 can be performed for various purposes. For example, the density of each color component of the first image 11G or the third image 13G is corrected based on the light emission characteristics of the illumination light used for the transmitted light of the image sheet 3. That is, for example, in a case where a color temperature of a light source of the illumination light is high and bluish, the density of each color component is corrected so that the first image 11G or the third image 13G becomes reddish to compensate for it.

In addition, the correction may be performed according to the color characteristics of the base layer 10 or white (W) ink. In addition, the image sheet 3 may be corrected so as to be more conspicuous or softer according to the purpose of displaying the image sheet 3.

Figure 7:
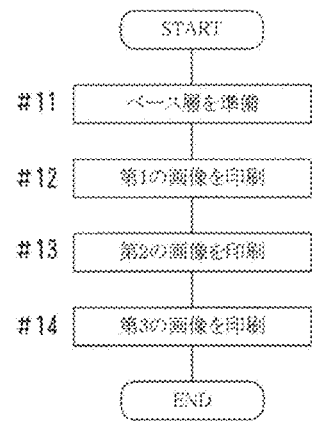
FIG. 7 is a flowchart showing a method for producing an image sheet by the image printing system.

FIG. 7 shows an example of a method for producing the image sheet 3.

In FIG. 7, a base layer formed of a light-transmitting white resin film is prepared (#11). The first image 11G is printed on a surface of the base layer (#12), and the second image 12G having a density set based on the density of the color components of the image is printed thereon using white ink (#13), and the third image 13G is further printed thereon (#14).

In addition, as necessary, a protective layer may be formed on the uppermost surface or an adhesive layer for bonding the image sheet 3 may be formed on the back surface of the base layer 10.

[Image Sheet 3B of Another Example]

Figure 8:
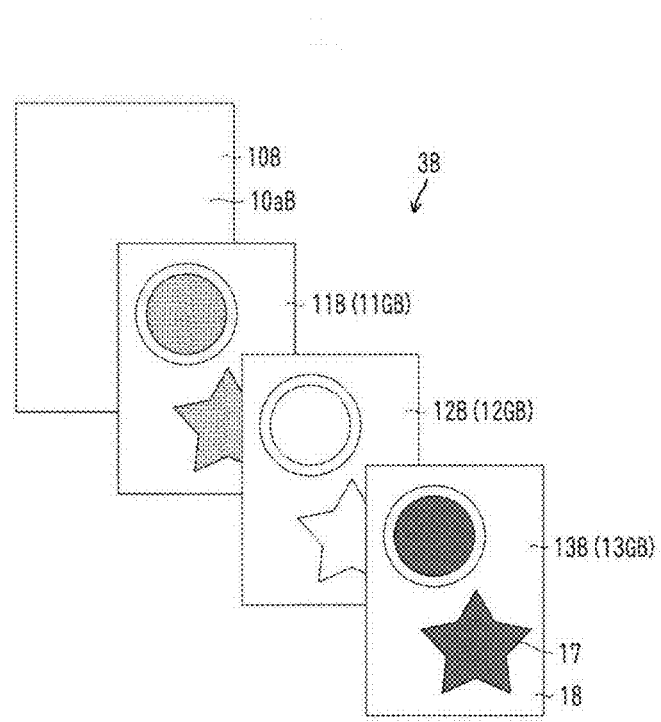
FIG. 8 is a diagram for explaining another configuration of the image sheet according to the invention.
Figure 9A:
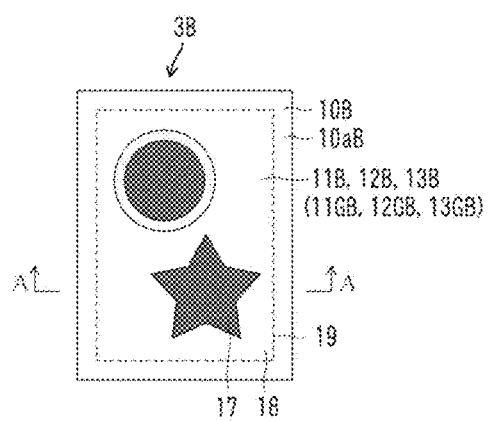
FIGS. 9A and 9B are diagrams for explaining a state of each layer of the image sheet of FIG. 8.
Figure 9B:
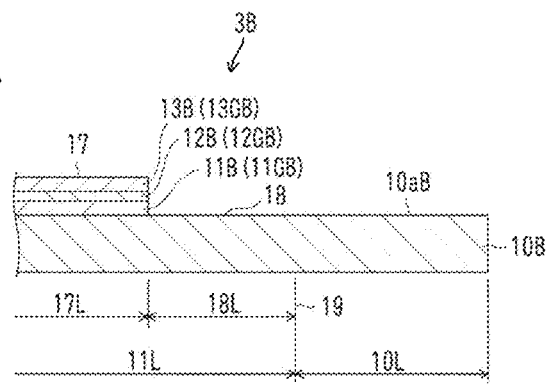

FIG. 8 is a diagram explaining the image sheet 3B which is another configuration according to the invention, and FIGS. 9A and 9B are diagrams explaining a state of each layer of an image sheet 3B, respectively. FIG. 9A is a front view of the image sheet 3B, and FIG. 9B is a cross-sectional arrow view of the image sheet 3B taken along line A-A of FIG. 9A. In FIG. 9B, a thickness of each layer is enlarged.

As shown in FIGS. 8, 9A, and 9B in the image sheet 3B, a first image layer 11B, a second image layer 12B, and a third image layer 13B having a size smaller than that of a base layer 10B are formed on the base layer 10B by printing.

That is, the image sheet 3B includes the base layer 10B, the first image layer 11B formed of a first color image 11GB formed on the base layer 10B, the second image layer 12B formed of a second white image 12GB formed on the first image layer 11B so that a position of the same image as the first image 11GB is superimposed on the position of the first image, and the third image layer 13B formed of a third color image 13GB formed on the second image layer 12B so that a position of the same image as the first image 11GB is superimposed on the position of the first image.

The density and color of each of the first image 11GB, the second image 12GB, and the third image 13GB are the same as those of the first image 11G, the second image 12G, and the third image 13G for the image sheet 3 described above.

Each of the first image 11GB, the second image 12GB, and the third image 13GB is an image in which an illustration graphic 17 is arranged in a white (colorless) background 18.

Since the background 18 is in white (colorless), the density of the background 18 in the first image 11GB, the second image 12GB, and the third image 13GB is substantially 0. That is, in the first image layer 11B, the second image layer 12B, and the third image layer 13B, the ink hardly adheres to a region 18L of the background 18 shown in FIG. 9B, and the thickness of the layer is substantially 0.

Therefore, the density of the color of the region 18L of the background 18 is not affected by the second image layer 12B. Accordingly, there is no level difference in density or color between the region 18L of the background 18 and a region 10L outer side of the image. Therefore, the edge of the image does not appear at a boundary part 19 (shown with a broken line in FIG. 9A) between a region 11L of the image and a region 10L on the outer side, and all the regions 18L and 10L other than a region 17L of the illustration graphic 17 become a uniform white background of a surface 10aB of base layer 10B As described above, in the image sheet 3B, the image quality does not deteriorate due to the edge of the image, and the value as an image sheet for advertisement or decoration is improved.

Figure 11A:
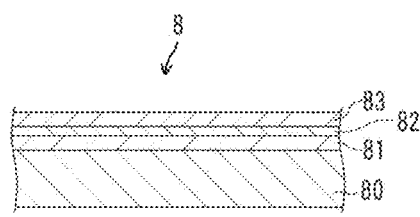
FIGS. 11A and 11B are perspective views for explaining a configuration of an image sheet of the related art.
Figure 11B:
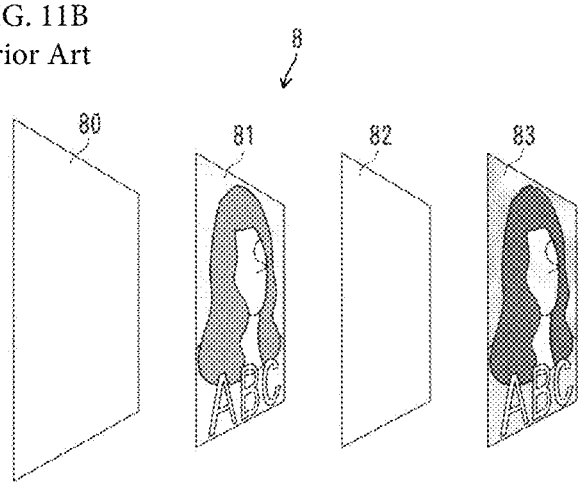
Figure 12A:
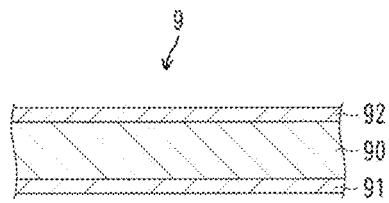
FIGS. 12A and 12B are perspective views for explaining another configuration of the image sheet of the related art.
Figure 12B:
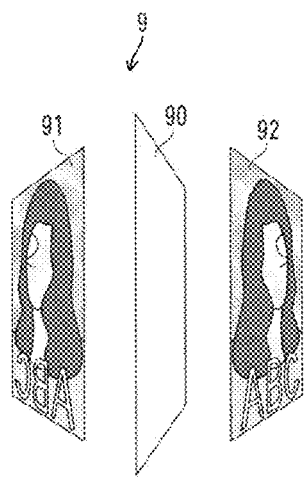

In addition, in the case of the same configuration as the image sheet 8 shown in FIGS. 11A and 11B of the related art, the original density or color of the image changes due to the presence of the milky white layer 82 having a constant thickness, and the edge of the image appears in the boundary part 19, thereby deteriorating the image quality.

[Grayscale Image Sheet 3C]

Figure 10A:
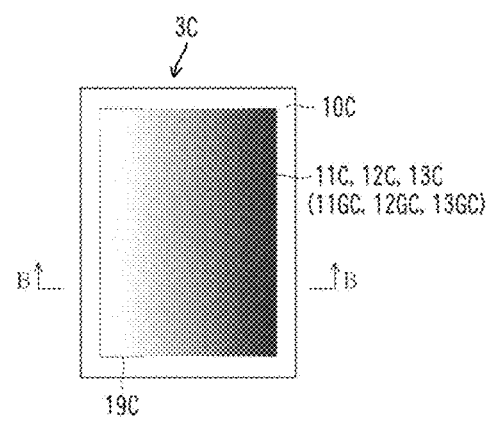
FIGS. 10A and 10B are diagrams for explaining the image sheet using a gray scale.
Figure 10B:
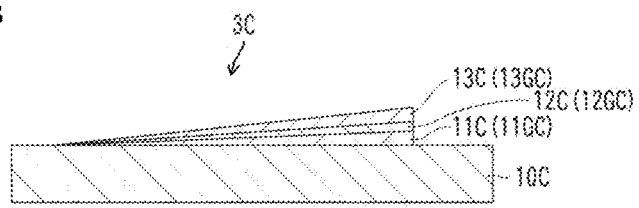

FIGS. 10A and 10B are diagramsfor explaining a grayscale image sheet 3C. FIG. 10A is a front view of the image sheet 3C, and FIG. 10B is a cross-sectional arrow view of the image sheet 3C taken along line A-A of FIG. 10A. In FIG. 10B, a thickness of each layer is enlarged.

As shown in FIGS. 10A and 10B, in the image sheet 3C, a first image layer 11C, a second image layer 12C, and a third image layer 13C having a size smaller than that of a base layer 10C are formed on the base layer 10C by printing.

That is, the image sheet 3C includes the base layer 10C, the first image layer 11C formed of a first color image 11GC formed on the base layer 10C, the second image layer 12C formed of a second white image 12GC formed on the first image layer 11C so that a position of the same image as the first image 11GC is superimposed on the position of the first image, and the third image layer 13C formed of a third color image 13GC formed on the second image layer 12C so that a position of the same image as the first image 11GC is superimposed on the position of the first image.

The first image 11GC and the third image 13GC are grayscale images in which the density continuously and uniformly changes from 0 to a maximum value in a horizontal direction (main scanning direction) of the drawing. Here, the image is black and white, but may have a color whose density changes continuously. Black and white is a type of color.

The second image 12GC is in white, and a density thereof is set based on the density of the first image 11GC or the third image 13GC. Therefore, in the same manner as in the first image 11GC or the third image 13GC, the density of the second image 12GC continuously and uniformly changes from 0 to a maximum value in the horizontal direction of the drawing.

As shown in FIG. 10B, the first image layer 11C, the second image layer 12C, and the third image layer 13C continuously change in terms of thickness from 0 to a maximum value in the horizontal direction of the drawing. Since the density at the left end of the image in the drawing is 0 or substantially 0, the thickness of the first image layer 11C, the second image layer 12C, and the third image layer 13C is 0 or substantially 0.

Therefore, the edge of the image does not appear at the boundary part 19C between the image and the region at the outer side thereof, and the white part of the grayscale image naturally extends to the end of the base layer 10C.

In addition, in the case of the same configuration as the image sheet 8 shown in FIGS. 11A and 11B of the related art, the density is increased or the color is changed even in the part where the grayscale density is 0 or substantially 0 due to the presence of the milky white layer 82 having a constant thickness, and accordingly, an accurate grayscale is not displayed. In addition, the edge of the image appears at the boundary part 19C.

In addition, also in the image sheet 3C shown in FIGS. 10A and 10B, the grayscale image is sharply displayed by both the transmitted light and the reflected light.

In the above-described embodiments, the first image 11G, the second image 12G, and the third image 13G are generated with the RGB data in the additive system, but the first image 11G, the second image 12G, and third image 13G may be generated with the CMYK data in a subtractive system.

In the above-described embodiments, the example in which the size of the base layer 10 is larger than that of the image to be printed has been described. However, the size of the base layer 10 may be the same as the size of the image to be printed. In a case where the image sheet 3 is accommodated in a panel frame and used as a panel, it is considered that the size of the base layer 10 is generally the same as or slightly larger than the size of the image.

In the above-described embodiments, the configurations of the image processing device 20, the printer 30, and the image printing system 1, the operation contents, the processing contents, the processing order, and the like can be variously changed in addition to the above description. In addition, the configuration, structure, image content, size, material, ink type, color, pigment material, and number of the image sheets 3, 3B, and 3C can be variously changed in accordance with the gist of the invention.

In the various embodiments described above, the respective aspects may be combined with each other.

The invention claimed is:

1. An image sheet for both transmitted light and reflected light, the image sheet comprising:
   a base layer formed of a light-transmitting white resin film;
   a first image layer formed of a first color image formed on one surface of the base layer;
   a second image layer formed of a second white image formed on the first image layer so that a position of the second white image, which is the same as the first color image, is superimposed on a position of the first color image; and
   a third image layer formed of a third color image formed on the second image layer so that a position of the third color image, which is the same as the first color image, is superimposed on a position of the first color image,
   wherein a density of the second image is set based on a density of each color component of the first image.

2. The image sheet according to claim 1,
   wherein a density of each color component of the first image is corrected based on light emission characteristics of illumination light used for transmitted light of the image sheet.

3. The image sheet according to claim 1,
   wherein the second image layer is formed by printing using white ink.

4. The image sheet according to claim 3,
   wherein ultraviolet curable ink is used as the white ink.

5. A method for producing an image sheet for both transmitted light and reflected light, the method comprising:
   forming a first image layer formed of a first color image on one surface of a base layer formed of a light-transmitting white resin film;
   forming a second image layer formed of a second white image that is the same image as the first color image on the first image layer so as to be superimposed on a position of the first color image; and
   forming a third image layer formed of a third color image that is the same image as the first color image on the second image layer so as to be superimposed on a position of the first color image,
   wherein a density of the second white image is set based on a density of each color component of the first color image.

6. A method for producing an image sheet for both transmitted light and reflected light based on original color image data, the method comprising:
   forming a first image layer by printing a first color image based on the original color image data on one surface of a base layer formed of a light-transmitting white resin film;
   forming a second image layer by printing a second white image based on the original color image data on the first image layer so as to be superimposed on a position of the first color image; and
   forming a third image layer by printing a third color image based on the original color image data on the second image layer so as to be superimposed on a position of the first color image,
   wherein a density of the second white image is set based on a density of each color component of the original color image data.

7. The method for producing an image sheet according to claim 6,
   wherein the density of the second white image is set based on an average value of the density of each color component of the original color image data.

8. The method for producing an image sheet according to claim 6,
   wherein the second image layer is formed by printing using white ink.

9. The method for producing an image sheet according to claim 8,
   wherein ultraviolet curable ink is used as the white ink.

10. A method for producing an image sheet for both transmitted light and reflected light based on original color image data, the method comprising:
    forming a first image layer by printing a first color image based on the original color image data on one surface of a base layer formed of a light-transmitting white resin film;
    forming a second image layer by printing a second white image based on the original color image data on the first image layer so as to be superimposed on a position of the first color image; and
    forming a third image layer by printing a third color image based on the original color image data on the second image layer so as to be superimposed on a position of the first color image,
    wherein a density of each color component of the first color image is corrected based on light emission characteristics of illumination light used for the transmitted light of the image sheet, with respect to a density of each color component of the original color image data.

11. A method for producing an image sheet for both transmitted light and reflected light based on original color image data, the method comprising:
    forming a first image layer by printing a first color image based on the original color image data on one surface of a base layer formed of a light-transmitting white resin film;
    forming a second image layer by printing a second white image based on the original color image data on the first image layer so as to be superimposed on a position of the first color image; and
    forming a third image layer by printing a third color image based on the original color image data on the second image layer so as to be superimposed on a position of the first color image,
    wherein a density of each color component of the first color image is reduced so as to have a predetermined ratio to a density of each color component of the original color image data.

* * * * *

UNITED STATES PATENT AND TRADEMARK OFFICE
CERTIFICATE OF CORRECTION

| | | |
|---|---|---|
| PATENT NO. | : 11,247,480 B2 | Page 1 of 1 |
| APPLICATION NO. | : 16/763896 | |
| DATED | : February 15, 2022 | |
| INVENTOR(S) | : Matsumoto | |

It is certified that error appears in the above-identified patent and that said Letters Patent is hereby corrected as shown below:

On the Title Page

Item (56), Column 2, Foreign Patent Documents, Line 1, delete "S62298894" and insert -- S62297894 --

Signed and Sealed this
Twenty-fourth Day of May, 2022

Katherine Kelly Vidal
*Director of the United States Patent and Trademark Office*